United States Patent [19]

Fay

[11] 4,013,234
[45] Mar. 22, 1977

[54] DOUGH MIXER

[75] Inventor: Rudolph J. Fay, Cincinnati, Ohio

[73] Assignee: J. W. Fay & Son, Inc., Cincinnati, Ohio

[22] Filed: Nov. 5, 1975

[21] Appl. No.: 628,896

[52] U.S. Cl. .............. 241/101.6; 241/247; 259/109

[51] Int. Cl.² ........................ B02C 19/00

[58] Field of Search ......... 241/89.2, 101.2, 101.5, 241/101.6, 243, 247; 259/109

[56] References Cited

UNITED STATES PATENTS

| 45,744 | 1/1865 | Perry | 241/247 |
|---|---|---|---|
| 352,132 | 11/1886 | Johnson | 241/243 X |
| 1,190,168 | 7/1916 | Holly | 241/101.6 |
| 1,355,137 | 10/1920 | Frick | 259/109 |
| 1,869,243 | 7/1932 | Fraser | 241/247 |
| 3,090,606 | 5/1963 | Burnet | 259/109 |

Primary Examiner—Granville Y. Custer, Jr.
Attorney, Agent, or Firm—Wood, Herron & Evans

[57] ABSTRACT

A dough mixer having a chopper section and a mixer section. The chopper section is at the inlet end of the mixer and includes a series of blades spaced longitudinally on a mixer shaft. The chopper blades are disposed in a plurality of planes normal to the shaft's axis, and extend outwardly from that shaft through a grilled floor in an inlet hopper, thereby insuring a complete and thorough break up of recycled dough. The mixer section is downstream of the chopper section and also includes a series of blades fixed to the mixer shaft. The mixer blades are also disposed in a plurality of planes normal to the shaft's axis but the mixer blades within each plane are angulated or pitched relative to that plane. Further, the mixer blades increase in pitch between succeeding planes from the inlet end to the outlet end of the mixer section, thereby insuring a homogeneous dough. The dough is exhausted from the dough mixer by gravity through an outlet port.

13 Claims, 6 Drawing Figures

DOUGH MIXER

This invention relates to mixers. More particularly, this invention relates to a novel and improved dough mixer.

Historically, potato chips were produced by slicing potatoes in relatively thin slices and then frying those potato slices into a solid wafer-like chip configuration. The final geometric configuration of those chips was, of course, uncontrollable. Hence, the chips were simply marketed in sack like bags, in large diameter cans, or the like, which could accommodate the large volume necessary to hold a relatively small weight of potato chips.

In recent years, however, a new manufacturing method for potato chips has been introduced into commercial use. In this method, potato flakes and water are admixed together in a suitable mixer device to form a dough. The potato dough is then spread out in thin, wafer-like sheets where identical size discs of the potato dough are cut from the sheet. The discs are then cooked under controlled conditions so that each disc has the same geometry after manufacture. These dough-based potato chips can then be marketed in tennis ball type cannisters with the chips being stacked one on top the other in layer-like fashion. Such, of course, permits a given weight of chips to be marketed in a package of much smaller exterior dimensions than would be necessary for the same weight of chips manufactured by the historical method. A novel potato chip processing method utilizing potato dough as the feedstock material from which the chips are made is particularly illustrated and described in copending U.S. Pat. application Ser. No. 628,895 entitled "Apparatus for Producing and Packaging Food Chips", invented by Rudolph J. Fay, filed simultaneously with this application, and assigned to the assignee of this application. The dough mixer of this invention is particularly useful in mixing potato dough for the method disclosed in, and in combination with the apparatus disclosed in, the aforementioned application.

In the manufacture of dough-based potato chips, admixing of the raw material infeed, i.e., a potato flakes and water slurry, into the dough is an integral and important step in the sense that a dough of a very homogeneous consistency is required. However, in the manufacture of dough-based potato chips there is substantial scrap dough left over after cutting of the dough from a rolled out sheet form into disc or chip form, i.e., there is substantial scrap dough left over after the chip-like discs have been cut out from a flat dough sheet. This scrap potato dough is preferably recycled through the mixer so as to provide an economic manufacturing process. Importantly, of course, the scrap potato dough must be intimately and thoroughly admixed with the raw material infeed, i.e., with the potato flakes and water slurry, fed into the dough mixer. This is necessary to provide the homogeneous potato dough required in the subsequent processing of the potato dough chips cut from a potato dough sheet.

A non-homogeneous potato dough causes problems in the cooking portion of the dough-based potato chip manufactuing method. A non-homogeneous potato dough is apt to form laminations when sheeted, i.e., when rolled into sheet form, prior to cutting of the chip discs from the dough. The laminations of each dough disc then tend to separate when the potato chip is cooked. Such separation, of course, provides an unacceptable commercial product in that same may substantially weaken the chip from a strength standpoint (indeed, may even cause the chip to break apart prior to packaging) and/or may cause such chips to have an incorrect geometrical configuration. A nonuniform geometrical configuration is unacceptable in a dough-based potato chip product for the very reason that one purpose of such a process is to produce potato chips with identical geometrical characteristics as it is that identically of geometry which permits the new potato chip cannister type packaging technique to be used.

It has been found that dough mixers known to the prior art, when used with potato dough compounded for potato chip production purposes, do not provide a sufficiently homogeneous potato dough from the manufacturing standpoint. That is, the potato dough provided by dough mixers known to the prior art does not intimately admix the potato dough scrap, and the potato flakes/water slurry infeed, so as to prevent delamination of the potato chip as same is cooked in subsequent downstream processing steps.

Accordingly, it has been the primary objective of this invention to provide a novel and improved dough mixer capable of providing a homogeneous dough product when the mixer's infeed includes dough scrap.

It has been another objective of this invention to provide a novel and improved dough mixer particularly adapted for use in manufacturing a potato dough when the mixer infeed includes a potato dough scrap, and a potato flake/water slurry, that potato dough so produced being commercially useful for potato chip production.

In accord with these objectives, the dough mixer of this invention in the preferred form, includes a chopper section and a mixer section. the chopper section is at the inlet end of the mixer and includes a series of blades spaced longitudinally on a mixer shaft. The chopper blades are disposed in a plurality of planes normal to the shaft's axis, and extend outwardly from that shaft through a grilled floor in an inlet hopper, thereby insuring a complete and thorough break up of recycled dough. The mixer section is downstream of the chopper section and also includes a series of blades fixed to the mixer shaft. The mixer blades are also disposed in a plurality of planes normal to the shaft's axis but the mixer blades within each plane are angulated or pitched relative to that plane. Further, the mixer blades increase in pitch between succeeding planes from the inlet end to the outlet end of the mixer section, thereby insuring a homogeneous dough. The dough is exhausted from the dough mixer by gravity through a outlet port.

Other objectives and advantages of this invention will be more apparent from the following detailed description taken in conjunction with the drawings in which.

Figure 1:
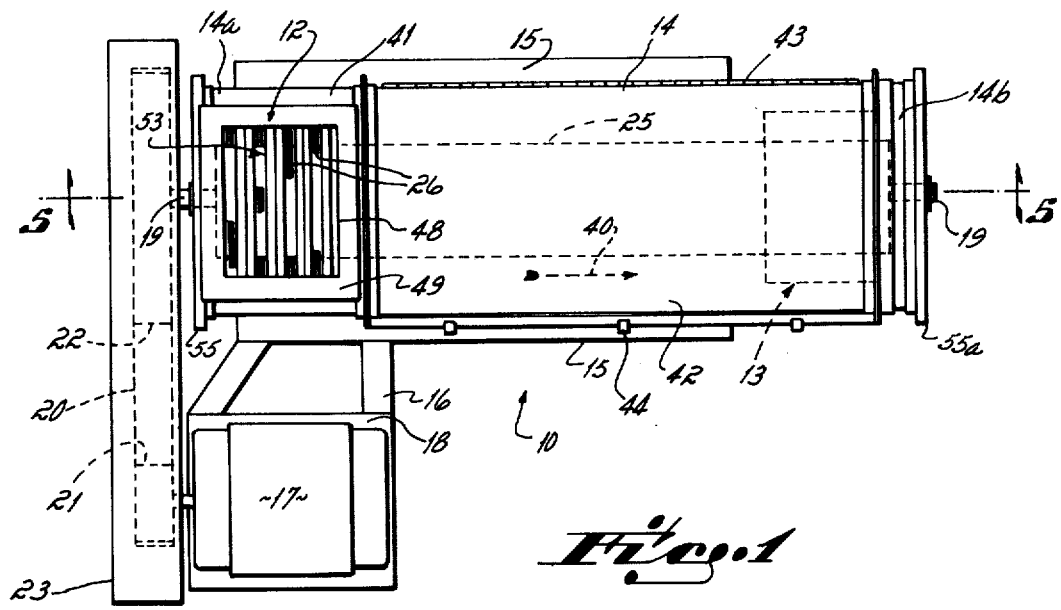
FIG. 1 is a top view of a dough mixer in accord with the principles of this invention.
Figure 2:
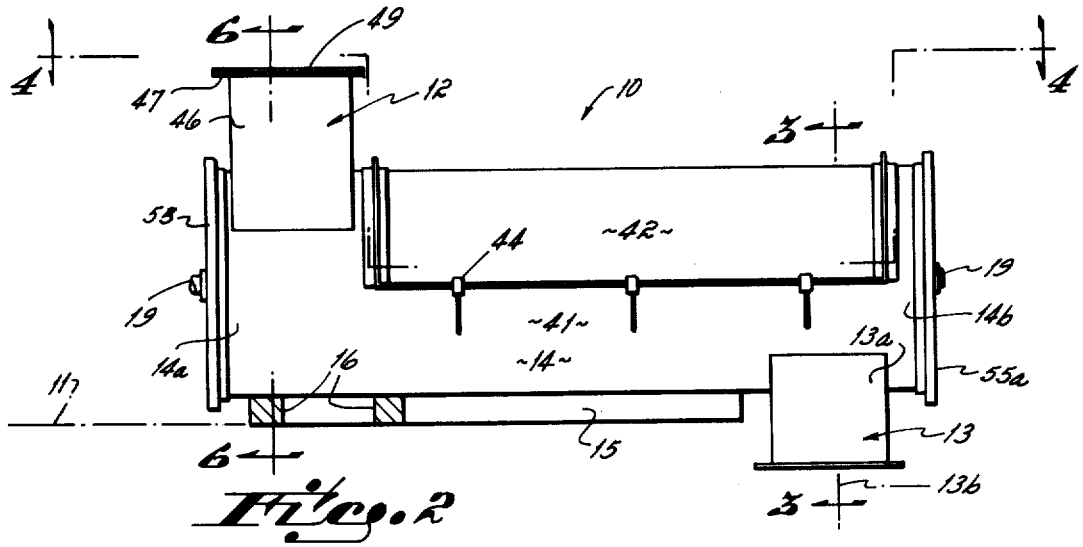
FIG. 2 is a side view of the dough mixer illustrated in FIG. 1.

The dough mixer 10 of this invention is generally cylindrical in configuration, is disposed horizontal relative to a mounting level 11, and has a inlet 12 and outlet 13. The dough mixer's cylindrical housing 14 is carried on a framework 15. A motor mount framework 16 extends from the mixer framework 15. The motor framework 16 carries drive motor 17 on platform 18 fixed to that motor framework. The drive motor 17 is drivingly interconnected with the dough mixer's drive shaft 19 by a drive belt 20, drive pulley 21, and driven pulley 22. A belt guard 23 is provided for safety reasons around the belt 20 and pulleys 21, 22. This basic structural arrangement is illustrated in FIGS. 1 and 2.

Figure 4:
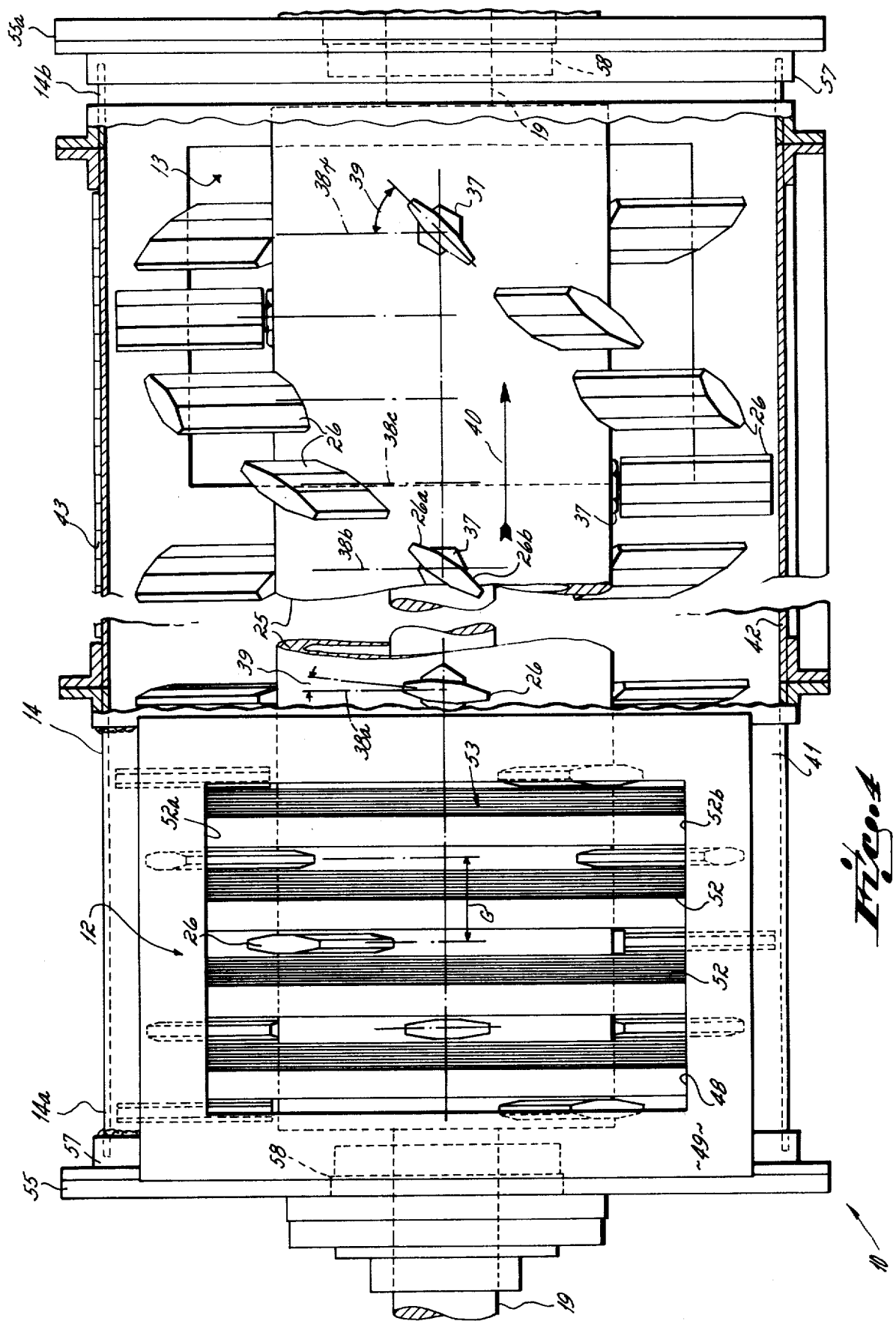
FIG. 4 is a cross-sectional view taken along line 4—4 of FIG. 2.
Figure 5:
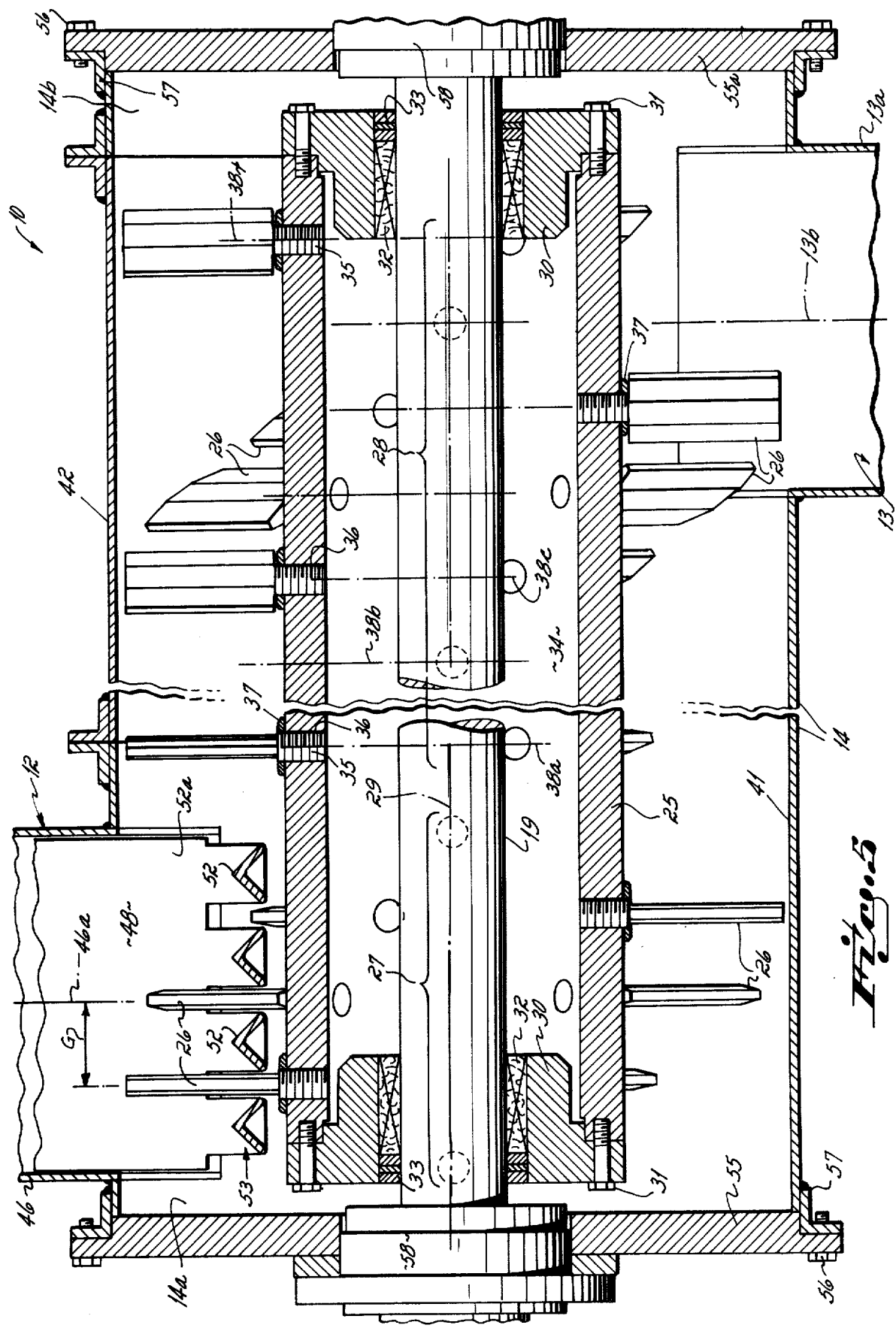
FIG. 5 is a cross-sectional view taken along line 5—5 of FIG. 1.
Figure 6:
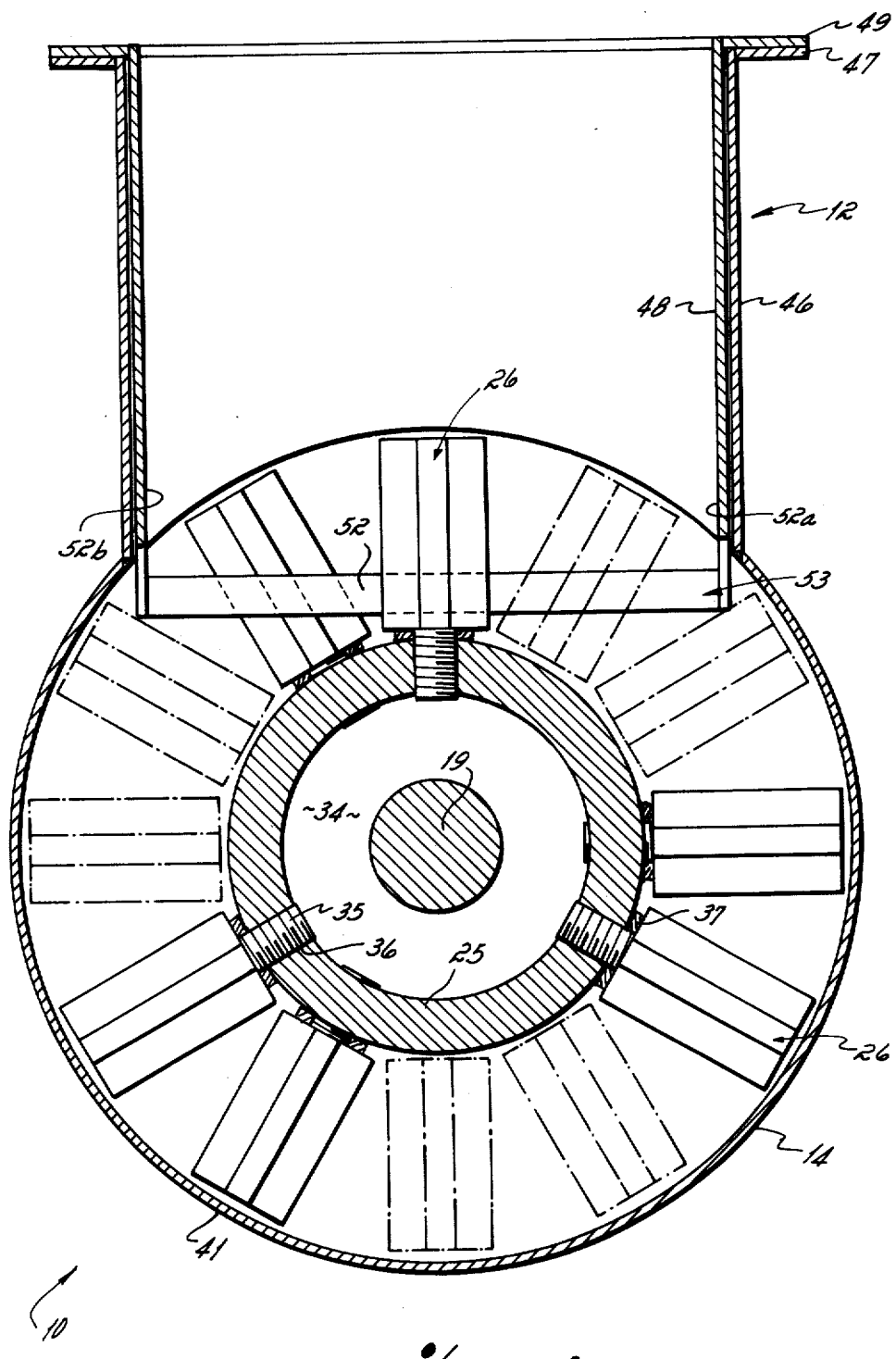
FIG. 6 is a cross-sectional view taken along line 6—6 of FIG. 2.

The dough mixer 10 itself includes the main housing 14 within which a tubular mixer shaft 25 is coaxially disposed, see FIGS. 4–6. The tubular mixer shaft 25 carries a plurality of blades 26 thereon, the blades being subdivided into two functional sections vis-a-vis the length of the shaft, namely, a chopper section 27 and a mixer section 28. Note that all blades 26 are identical one to the other throughout the length of the mixer shaft 25, and that each blade is substantially flat although slightly tapered at its leading 26a and trailing 26b edges. The tubular mixer shaft 25 is coaxially mounted in a fixed relation to the drive shaft 19 which extends through the mixer's housing 14 from inlet end 14a to outlet end 14b, the drive shaft 19 itself being coaxially aligned with the housing's (and, therefore, the mixer's) axis 29. The mixer shaft 25 is fixed to the drive shaft 19 through headplates 30 at each end, each headplate being fixed to the tubular mixer shaft by bolts 31 spaced around the periphery of the headplate. Each headplate 30 is provided with a packing gland 32 and sealing rings 33 so as to prevent leakage of infeed materials (at the inlet end 14a of the mixer) and dough (at the outlet end 14b of the mixer) into the interior 35 of the tubular mixer shaft. The sealing rings 33 are keyed to the drive shaft 19 and to the headplate 30 at each end of the mixer shaft 25 by keys and keyways, not shown.

Figure 3:
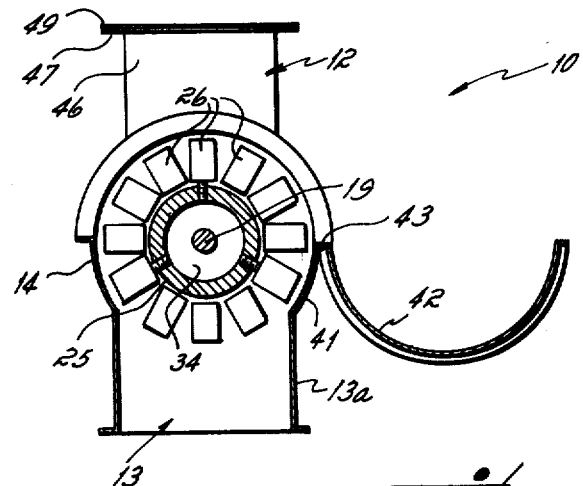
FIG. 3 is a cross-sectional view taken along line 3—3 of FIG. 2.

As previously mentioned, a plurality of blades 26 are fixed to the tubular mixer shaft 25. Each blade 26 is mounted to the tubular mixer shaft 25 by a threaded stem 35 integral with the inner end of the blade, that stem mating with a threaded bore 36 in the mixer shaft. A lock nut 37 engaged with each blade's stem 35 holds the blade 26 in its desired radial and angular position relative to the outer surface of the mixer shaft 25. Note that the blades 26 are not disposed at random relative to the length of the mixer shaft 25, but are located in blade planes 38 spaced along the length of the shaft and disposed normal to the shaft's axis 29. As illustrated in FIGS. 3 and 6, three such blades 26 are spaced equally about the periphery of the mixer shaft in each blade plane 38.

The substantially planar blades 26 in each blade plane 38 within the chopper section 27 of the mixer 10 are located in that plane, i.e., are disposed transverse to the shaft's axis 29 and, in other words, are not angulated relative to the blade plane, see FIGS. 4 and 5. However, and as is also readily apparent in FIGS. 4 and 5, the blades 26 in each of the blade planes 38 within the mixer section 28 are, in fact, angularly disposed relative to the respective blade plane within which each is located. The angularity or pitch of each blade 26 within a single blade plane 38 in the mixer section 28 is the same. However, the angularity or pitch of the blades 26 within successive blade planes 38a, 38b, 38c, and so forth, from the inlet end to the outlet end of the mixer section 28 increases, see FIGS. 4 and 5. In other words, the pitch angle 39 of blades 26 within the first blade plane 38a of the mixer section 28 is less than the pitch angle of the blades in the next adjacent downstream blade plane 38b, the pitch angle of those blades within the second blade plane 38b of the mixer section is less than the pitch angle of the blades in the next adjacent downstream blade plane, and so on. It will be apparent, therefore, that the maximum pitch angle 39 of the blades 26 will be present in the last or fartherest downstream blade plane 38x relative to the flow direction 40 through the mixer 10. The pitch angle 39 of the blades 26 is increased from the inlet of the mixer section 28 to the outlet of the mixer section to provide better homogeneity in the dough being admixed within the dough mixer 10. Furthermore, the pitch of the blades 26 within the mixer section 28 serves to force the dough through the mixer section to the outlet 13 of the mixer itself.

This variable pitch angle of the blades 26 within the mixer section 28 may be easily set upon initial manufacture because of the threaded stem 35 and lock nut 37 mounting means of the blades with the mixer shaft 25 itself. Furthermore, this threaded connection of the blades 26 with the mixer shaft 25 permits the pitch angle 39a14 39x of the blades 26 to be varied as desired, if necessary, depending on the type dough to be processed through the dough mixer itself.

The dough mixer's housing 14, as illustrated in FIGS. 2, 3 and 5, includes a cylindrical outer shell 41 within which the blade mixer shaft 25 is coaxially disposed. The outer shell 41 is horizontally oriented relative to mounting level 11, and is provided with the vertically disposed inlet 12 on the top thereof at the inlet end of the mixer, and the vertically disposed outlet 13 on the bottom thereof at the inlet end of the mixer. The vertically disposed inlet 12 on top of the mixer permits the material infeed to be introduced into the mixer's chopper section 27 by gravity, and the vertically disposed outlet 13 on the bottom thereof permits the admixed dough to fall from or be discharged from the mixer by gravity. The outlet 13 is defined by a rectangular tubular member 13a fixed in place to the housing's shell 41, that member having a vertical axis 13b. The mixer's housing 14 includes an access door 42 extending along the top of the housing throughout the length of the mixer section 28. The access door 42 is hingedly mounted to the main part of the housing on a hinge line 43 parallel to axis 29, and is held in closed relation with the housing by suitable latches 44. The access door 42 provides access to the pitched blades 26 within the mixer section 28, and permits the angulation or pitch of those blades to be changed as desired depending upon the dough to be processed through the dough mixer. The access door 42, of course, also permits cleaning of the blades 26 and mixer shaft 25 within the mixer section 28.

The dough mixer's inlet 12 is especially structured to cooperate with the blades 26 within the chopper section 27 of the dough mixer 10, see FIGS. 4–6. The inlet 12 is defined by a rectangular and tubular hopper 46 fixed in place to the housing's shell 41, that member having a vertical axis 46a and having an external lip 47 around the top edge thereof. The hopper 46 receives an identically configured hopper insert 48 in telescoping relation therewith, the hopper insert having exterior dimensions just slightly less than the interior dimensions of the hopper 46 itself, see FIG. 6. The hopper insert 48 is also provided with an external lip 49 around the top edge thereof, the hopper insert's lip 49 being seated on the hopper's lip 47 when the two are in operation relation as shown in FIG. 6, thereby locating the hopper insert relative to the blades 26 fixed to the mixer shaft 25.

The hopper insert 48 includes a series of inverted V-shaped bars 52 fixed between those walls 46a, 46b of its side walls which are parallel to the mixer's axis 29. The bars 52 are thereby oriented parallel to the blade planes 38 of the blades 26 within the mixer's chopper section, and a bar 52 is provided between each pair of adjacent planes 38, to form a grillwork 53 of bars as the floor of the hopper insert 48. The hopper insert's floor or inverted V-shaped grillwork 53 is positioned adjacent the exterior periphery of the mixer shaft 25 so that substantially all of each blade 26 within the chopper section 27 passes through that grillwork during rotation of the mixer shaft, see FIGS. 5 and 6. The inverted V-shaped bars 52 are sized, relative to the gap G or distance between succeeding blade planes 38 within the chopper section 27, to substantially close that gap but yet permit free rotation of the blades, see FIG. 4.

The hopper insert 48 with grillwork 53 provides a couple of advantages to the dough mixer 10 of this invention. In the first instance, the grillwork 53 may be easily removed from operational relation with the dough mixer simply by lifting same up out of the hopper 46. This permits easy cleaning of the grillwork 53 itself, and also permits cleaning of the blades 26 and of the mixer shaft 25 within the chopper section 27 of the dough mixer. After such cleaning, of course, the hopper insert 48 is simply slipped back into the hopper 46, and the grillwork 53 is automatically positioned relative to the exterior periphery of the mixer shaft 25 by the insert's lips 49 which rest on the hopper's lips 47. This grillwork 53 structure, when removed from the interior of the dough mixer's housing 41, also permits the mixer shaft 25 to be pulled or removed totally from the dough mixer for a thorough and complete cleaning if that is desired. In the second instance, the grillwork 53 provides an initial cutting and mixing action for the combination of recycled dough scrap and dough raw material infeed. As previously mentioned, and in the production of a potato dough for potato dough-based potato chips, delamination of a potato dough using a recycled potato dough scrap has been a problem in the past. The cooperative interrelationship of the blades 26 and the grillwork 53 within the mixer's chopper section 27 substantially eliminates this problem as same insures a complete chopping of the dough scrap prior to the infeed materials passing into the mixer section 28 of the dough mixer.

The dough mixer 10 is closed at each end of the housing 14 by a housing cap 55. Each housing cap 55 is fixed by bolts 56 to peripheral flange 57 welded to the exterior periphery of the housing's cylindrical body 41. The dough mixer's drive shaft 19 is carried at each end in a bearing assembly 58 mounted in each of the housing caps 55. As previously mentioned, the entire mixer shaft 25 may be removed from the dough mixer's housing 14 by withdrawing the hopper insert 48 (and, hence, the grillwork 53) from the hopper 46, and then by removing cap 55a from bolted engagement with the housing's cylindrical body 41. Thereafter, the mixer shaft 25 itself may be withdrawn from the interior of the mixer's housing 14 for cleaning, or for adjustment of the blade 26 pitch within the mixer section 28, as desired.

In use, and when the dough mixer 10 of this invention is used for producing a potato dough suitable for manufacture of potato dough-based potato chips, the material infeed into the mixer constitutes recycled potato dough scrap and a potato flakes/water slurry. This material infeed is introduced into the dough mixer through the inlet 12. Rotation of the mixer shaft 25 causes the blades 25 within the chopper section 27 to pass intermittently through the hopper insert's grillwork 53, and because of the relatively small clearance between blades and grillwork the recycled scrap is intimately chopped up as it is driven through that grillwork by the blades within the chopper section. The material infeed passes from the mixer's chopper section 27 into the mixer section 28 where it is intimately admixed into a potato dough of a homogeneous consistency sufficient to prevent delamination of potato chip discs cut from the dough once same has been sheeted in a downstream processing step (not shown). This intimate admixing of the infeed into a homogeneous dough is accomplished by rotation of the blades 26 within the mixer section 28. The pitch 39 of the blades 26 within the mixer section 28 tends to push the dough from the mixer's inlet 12 toward the mixer's outlet 13. The dough at the mixer's outlet 13 passes therefrom with the aid of gravity through outlet member 13a. Rotation of the mixer shaft 25 is continuous during operation of the dough mixer, and the mixer shaft is rotated by the drive motor 17, drive belt 20 and pulleys 21, 22 as before mentioned.

Having described in detail the preferred embodiment of my invention, what I desire to claim and protect by Letters Patent is:

1. A mixer for admixing a food dough comprising
a mixer housing
a plurality of blades fixed to a single mixer shaft disposed within said mixer housing, said blades all being of the same geometry,
an inlet hopper having a grillwork floor disposed adjacent the exterior periphery of said single mixer shaft, a portion of said blades projecting up and through said grillwork floor during rotation of said mixer shaft, said blades and grillwork floor cooperating to cut thoroughly any recycled dough scrap upon introduction of same into said mixer, the blades that cooperate with said grillwork floor being in the chopper section of said mixer and the blades that do not cooperate with said grillwork floor being in the mixer section of said mixer,
mounting means connecting said blades to said single mixer shaft, said mounting means being operable to adjust the pitch of said blades relative to a plane transverse to the axis of said mixer shaft, said blades within said chopper section lying substantially transverse to the axis of said mixer shaft, said blades within said mixer section being pitched relative to the axis of said mixer shaft, and the pitch of said blades increasing along the length of said mixer shaft within said mixer section from the inlet of said mixer section to the outlet of said mixer section, and
drive means connected with said mixer shaft for rotating said mixer shaft within said housing.

2. A mixer as set forth in claim 1 wherein said blades are disposed in blade planes spaced longitudinally one from the other along the length of said mixer shaft, each of said blade planes being substantially normal to the axis of said mixer shaft, and at least three blades being positioned in each blade plane.

3. A mixer as set forth in claim 1 wherein said mounting means includes a threaded stem and bore connection between said blades and said mixer shaft, and a lock nut to restrain said blades in the desired pitch position relative to said mixer shaft.

4. A mixer as set forth in claim 1 wherein said inlet hopper comprises a tubular hopper member having a first seating flange thereon, and a hopper insert having a second seating flange thereon, said hopper insert mounting said grillwork, and said seating flanges cooperating to position said hopper insert within said hopper and, thereby, position said grillwork relative to said mixer shaft.

5. A mixer as set forth in claim 1 wherein said mixer housing includes an access door hingedly connected to said housing, said access door being sized to provide access to substantially the entire mixer section for maintenance purposes.

6. A mixer as set forth in claim 1 wherein the outlet of said mixer is located in the bottom of said housing and the inlet of said mixer is located in the top thereof, thereby permitting gravity infeed to and gravity discharge from said mixer.

7. A mixer as set forth in claim 1 wherein said mixer housing includes an access door hingedly connected to said housing, said access door being sized to provide access to substantially the entire mixer section for maintenance purposes.

8. A mixer for admixing a food dough comprising a mixer housing a plurality of blades fixed to a mixer shaft disposed within said mixer housing, an inlet hopper having a grillwork floor disposed adjacent the exterior periphery of said mixer shaft, a portion of said blades projecting up and through said grillwork floor during rotation of said mixer shaft, said blades and grillwork floor cooperating to cut thoroughly any recycled dough scrap upon introduction of same into said mixer, the blades that cooperate with said grillwork floor being in the chopper section of said mixer and the blades that do not cooperate with said grillwork floor being in the mixer section of said mixer, said inlet hopper comprising a tubular hopper member having a first seating flange thereon, and a hopper insert having a second seating flange thereon, said hopper insert mounting said grillwork, and said seating flanges cooperating to position said hopper insert within said hopper and, thereby, position said grillwork relative to said mixer shaft, mounting means connecting said blades to said mixer shaft, said mounting means being operable to adjust the pitch of said blades relative to a plane transverse to the axis of said mixer shaft, and drive means connected with said mixer shaft for rotating said mixer shaft within said housing.

9. A mixer as set forth in claim 8 wherein the pitch of said blades varies along the length of said mixer shaft within said mixer section, the pitch increasing from the inlet end of said mixer section to the outlet end of said mixer section.

10. A mixer as set forth in claim 8 wherein said blades within said chopper section lie substantially transverse to the axis of said mixer shaft, and wherein said blades within said mixer section are pitched relative to the axis of said mixer shaft.

11. A mixer as set forth in claim 8 wherein said blades are disposed in blade planes spaced longitudinally one from the other along the length of said mixer shaft, each of said blade planes being substantially normal to the axis of said mixer shaft, and at least three blades being positioned in each blade plane.

12. A mixer as set forth in claim 9 wherein said mounting means includes a threaded stem and bore connection between said blades and said mixer shaft, and a lock nut to restrain said blades in the desired pitch position relative to said mixer shaft.

13. A mixer as set forth in claim 8 wherein the outlet of said mixer is located in the bottom of said housing and the inlet of said mixer is located in the top thereof, thereby permitting gravity infeed to and gravity discharge from said mixer.

* * * * *